H. PHILIPP.
METHOD OF REMOVING CARBONIC ACID GAS FROM NITROGEN GAS.
APPLICATION FILED JUNE 30, 1914.
1,239,516.
Patented Sept. 11, 1917.
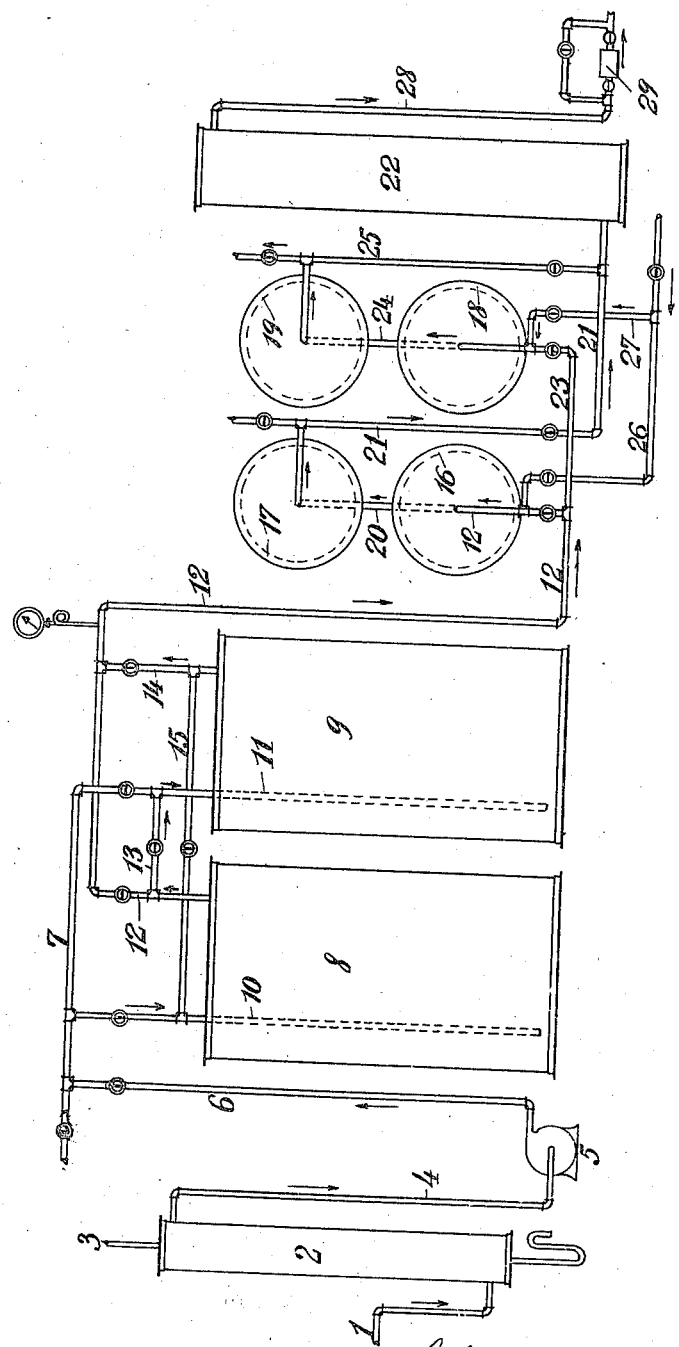
WITNESSES
Herbert Philipp
INVENTOR
BY HIS ATTORNEYS

UNITED STATES PATENT OFFICE.

HERBERT PHILIPP, OF PERTH AMBOY, NEW JERSEY, ASSIGNOR TO THE ROESSLER & HASSLACHER CHEMICAL CO., OF NEW YORK, N. Y., A CORPORATION OF NEW YORK.

METHOD OF REMOVING CARBONIC-ACID GAS FROM NITROGEN GAS.

1,239,516.  Specification of Letters Patent.  Patented Sept. 11, 1917.

Application filed June 30, 1914. Serial No. 848,134.

*To all whom it may concern:*

Be it known that I, HERBERT PHILIPP, a citizen of the United States of America, and resident of the city of Perth Amboy, county of Middlesex, and State of New Jersey, have invented certain new and useful Improvements in Methods of Removing Carbonic-Acid Gas from Nitrogen Gas, of which the following is a specification.

My invention relates to the production of pure nitrogen gas and has particular reference to a method of purifying a mixture of nitrogen and other gases by means of absorbents. In the manufacture of pure nitrogen gas various methods have been followed, one of said methods being the removal of carbonic acid gas by the combustion of a mixture of gas and air with the intention of obtaining pure nitrogen gas.

The removal of carbonic acid gas has, however, mostly been effected by passing the gas mixture through suitable containers charged with milk of lime, whereby carbonic acid gas has been absorbed, more or less pure nitrogen gas remaining at the end of the operation.

I have found, however, that in the manufacture of nitrogen gas on a larger scale, the complete absorption of carbon dioxid gas from the mixture is by no means an easy matter, and that milk of lime does not so readily combine with small quantities of carbon dioxid, unless the height of the column of milk of lime is beyond practical methods. Of course several containers charged with milk of lime can be used, connected in series, but even then it is found that to remove the last traces of carbon dioxid a very large number of containers have to be used in series, the number being out of proportion to the carbon dioxid in the gas. An example will explain this; an impure nitrogen gas (for instance flue gas) containing 18–21% $CO_2$, when passed through a ten foot column of milk of lime, will still contain from 3–5% $CO_2$; if the gas from this container is passed through a second container with a ten foot column of milk of lime in it, it will be found that only very little of the remaining carbon dioxid has been removed or combined with the calcium hydroxid, as the gas from this last container contains still 2–4% $CO_2$.

It is well known that a solution of an alkali hydroxid e. g. sodium hydroxid, will readily and quantitatively absorb carbon dioxid, forming sodium carbonate, but on account of the facility with which sodium carbonate crystallizes out, a method based on a reaction of this nature is impossible on a large scale as impractical and too expensive. Now I have found that by the addition of a relatively small quantity of a suitable substance of basic reaction, as for instance of an alkali hydroxid or carbonate, to the milk of lime, as for instance sodium hydroxid or carbonate, a very considerable increase in the power of absorption of carbon dioxid in the gas is obtained. It may be that the addition of sodium hydroxid to the milk of lime causes primarily a formation of sodium carbonate which being present only in a very small quantity, instantaneously reacts with the excess of lime present, being reconverted into sodium hydroxid by the action of calcium hydroxid or the sodium carbonate as by the following equations:—

(1.) 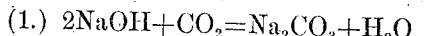  $2NaOH + CO_2 = Na_2CO_3 + H_2O$
(2.) 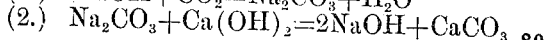  $Na_2CO_3 + Ca(OH)_2 = 2NaOH + CaCO_3$ The reactions represented by the above equations go on alternately and follow each other of course at indefinitely short intervals and in quick succession. The milk of lime obviously obtains by my new process constant absorption power, that is, it absorbs carbonic acid gas equally well, regardless of whether the milk of lime contains 30% CaO or 1% or less CaO. I have found by numerous tests that the content of sodium hydroxid remains constant during the process of absorption, while the content of calcium hydroxid gradually diminishes. Thus for instance, if a milk of lime is prepared by slaking 1200 lbs. commercial lime in 3000 lbs. of water, and to this a small quantity of commercial caustic soda is added (e. g. about 5 lbs.) it has been found that the solution will test approximately 28–30% CaO and 0.1% NaOH. The content of sodium hydroxid remains constant during the process of absorption until all the calcium hydroxid has been converted into calcium carbonate. Thus tests near the end of the absorption process, while giving a gas practically free from carbon dioxid, will show 0.8–0.0% CaO, and 0.1% NaOH. In this example tests during the process of absorption show every time the same amount of available sodium hydroxid. In contrast to the milk of lime alone, a gas as described above when passed through a ten foot column of milk of lime containing a very small quantity of sodium hydroxid, will test 0.5–1.0% $CO_2$, and if this gas is then passed through a second similarly charged container connected in series with the first one, then it is found that the gas is free from carbon dioxid, and consists, in this case, of nitrogen, moisture and perhaps a trace of oxygen; the two latter constituents being removed by known methods, a pure nitrogen gas is thus produced. I have found that the most convenient temperature to hold the milk of lime at is between 35–45° C., above this temperature too much moisture is carried with the gas.

For the better understanding of my process I shall describe in the following one way of carrying my invention into practice, reference being had to the accompanying drawing which is an elevation of one form of apparatus suitable for the purpose and shows in a rather diagrammatic way the details of operation of the process together with the apparatus preferably used in said operation.

The impure nitrogen gas enters the apparatus through pipe 1 and passes thence into the bottom of a scrubber 2 and up through the same against a descending flow of water entering the scrubber at the top through pipe 3. The gas is washed and cooled in the scrubber by the descending water and the temperature of the gas lowered to about 20–25° C. Scrubber 2 is connected by pipe 4 to the suction end of pump 5. The discharge end of pump 5 is connected by pipe 6 with main 7 in turn connected with lime agitators or containers 8 and 9 by pipes 10 and 11 respectively. 12 is the discharge pipe from lime agitator 8 and is cross connected to pipe 11 by pipe 13 and with discharge pipe 14 from agitator 9 as shown. 15 is a pipe cross connecting entrance pipe 10 to discharge pipe 14. All of said pipes are suitably valve controlled as shown. The two lime agitators are preferably connected in series with each other through pipes 6, 7, 10, 12, 13 and 11 and discharge through pipes 14 and 12 into a series of tubes 16, 17, 18 and 19 each containing copper heated to about 650–700° C. The gas enters the lower tube 16, thence through pipe 20 into tube 17 and thence into main 21 which leads to a drier 22. 23 is a pipe connecting pipe 12 with tube 18 and 24 is a pipe connecting tube 18 with tube 19. 25 is a pipe connecting tube 19 with main 21. 26 is a pipe connecting with pipe 12 and 27 is a branch from pipe 26 connecting with pipe 23. All of said pipes are suitably valve controlled as shown.

The gas passes from drier 22 through pipe 28 to meter 29 and thence is distributed wherever it is required. As shown the gas may be passed in series through tubes 16 and 17, or through tubes 18 and 19, as desired, or otherwise as the connections permit and the operation may be repeated as desired.

The lime agitators are preferably filled with a solution of 25 to 30% CaO containing a small quantity of sodium hydroxid in the proportion of 200–240 parts CaO to one part of NaOH. The scrubber is filled with suitable filling material over which water is run to cool the gases that they may enter the pump at a low temperature. In passing through the agitators the gases give off all their carbonic acid gas to the sodium hydroxid and calcium hydroxid respectively and are then passed into the highly heated copper tubes to be freed of their small content of oxygen. The importance of the addition of alkali hydroxid to the quick-lime solution is very great for whereas I formerly never succeeded in getting nitrogen free from carbonic acid gas, as is desirable for many operations, I now succeed by the continuous regenerating of sodium hydroxid as described in completely absorbing the carbonic acid gas and in rendering the nitrogen suitable for any purpose whatever where purity of nitrogen is a primary condition.

What I claim is:

1. The method of removing carbon dioxid from a gaseous mixture thereof with nitrogen, comprising reacting upon the gaseous mixture with an absorbent comprising milk of lime and a substance adapted to render the absorbent capable of readily removing substantially all of the carbon dioxid from the gaseous mixture.

2. The method of removing carbonic acid gas from nitrogen gas, consisting in passing the impure gas through milk of lime containing a small quantity of an alkali metal hydroxid.

3. The method of removing carbonic acid gas from nitrogen gas, consisting in passing the impure gas through milk of lime containing a small quantity of sodium hydroxid.

In testimony whereof I have signed this specification in the presence of two subscribing witnesses.

HERBERT PHILIPP.

Witnesses:
CATHERINE A. COSTELLO,
OTTO K. ZWINGENBERGER.